(No Model.)　　　　　　　　　　　　　　　　　　　　4 Sheets—Sheet 2.
E. EINFELDT.
HAY LOADER.

No. 531,521.　　　　　　　　　　　　　　Patented Dec. 25, 1894.

WITNESSES:
Raymond F. Barnes.
Fabrius A. Elmore

INVENTOR
Emil Einfeldt
BY
F. T. Dodge
ATTORNEY.

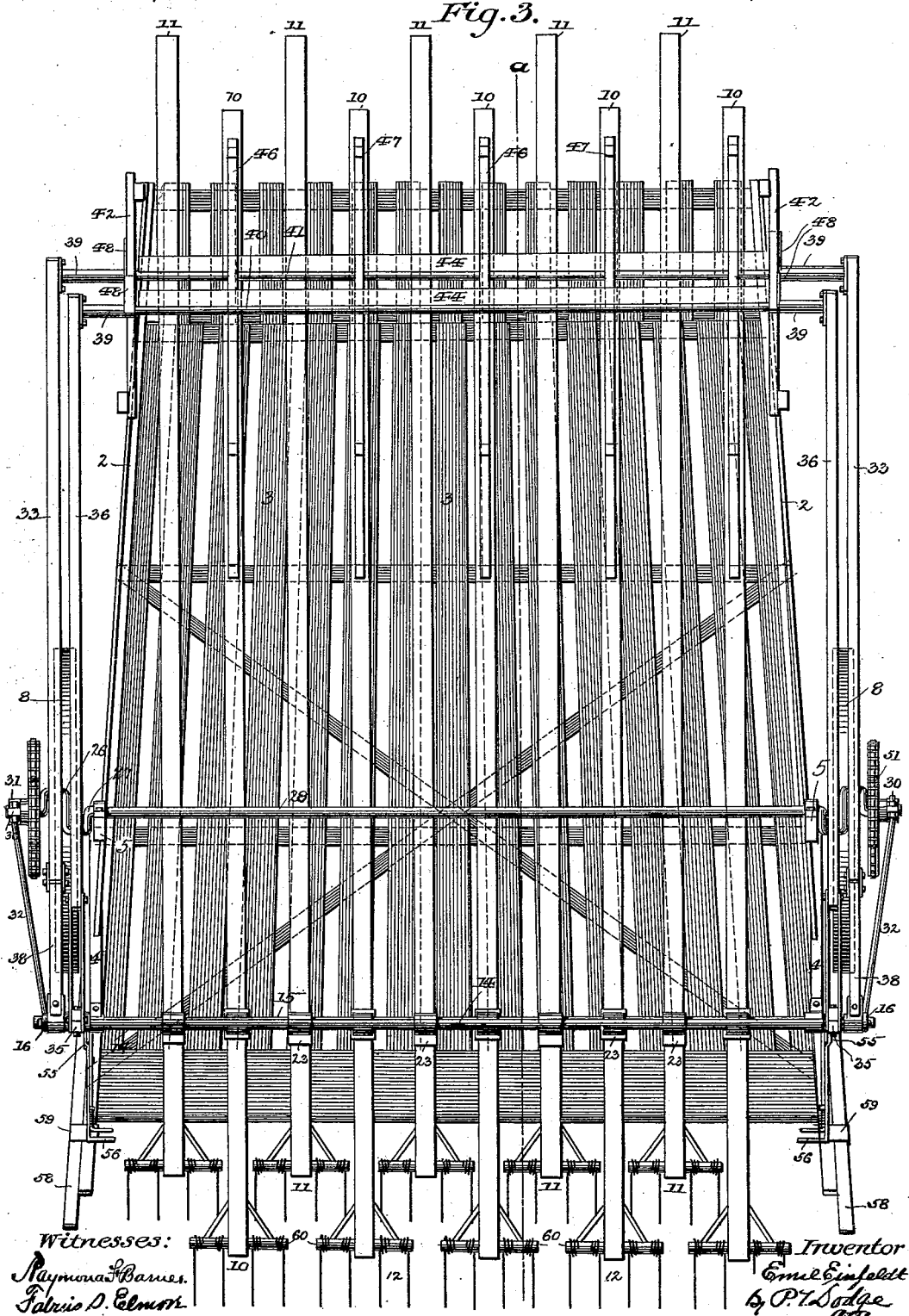

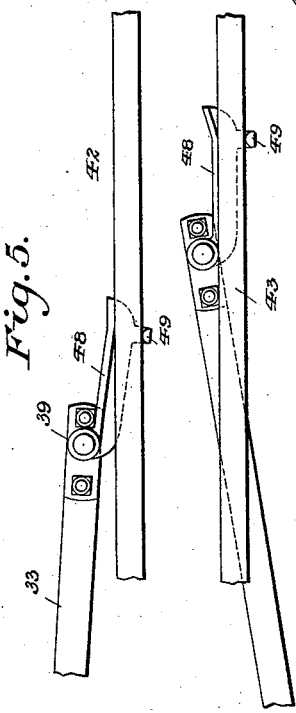

UNITED STATES PATENT OFFICE.

EMIL EINFELDT, OF DAVENPORT, IOWA, ASSIGNOR TO THE EAGLE MANUFACTURING COMPANY, OF SAME PLACE.

HAY-LOADER.

SPECIFICATION forming part of Letters Patent No. 531,521, dated December 25, 1894.

Application filed July 28, 1893. Serial No. 481,762. (No model.)

*To all whom it may concern:*

Be it known that I, EMIL EINFELDT, of Davenport, county of Scott, and State of Iowa, have invented a new and useful Improvement in Hay-Loaders, of which the following is a specification.

My invention relates to that class of hay loaders which are adapted to be drawn through the field, and comprising an inclined wheeled frame provided with a series of overlying rake bars acting to gather the hay and convey the same to the upper end of the frame whence it may be discharged into a wagon preceding the machine, or into any other suitable receptacle.

My invention consists of various improvements in loaders of this character, and relates more particularly to the manner of operating the rake bars to cause their lower ends to act with a long stroke near the ground; to the mechanism for moving the rake bars back and forth to cause their upper ends to rise partially from the ascending hay as they are moved to the rear; to the mechanism for raising and lowering the lower end of the frame; to the form of the gathering teeth and manner of securing the same; and to various other details designed to render the operation of the machine perfect and effective.

Figure 1:
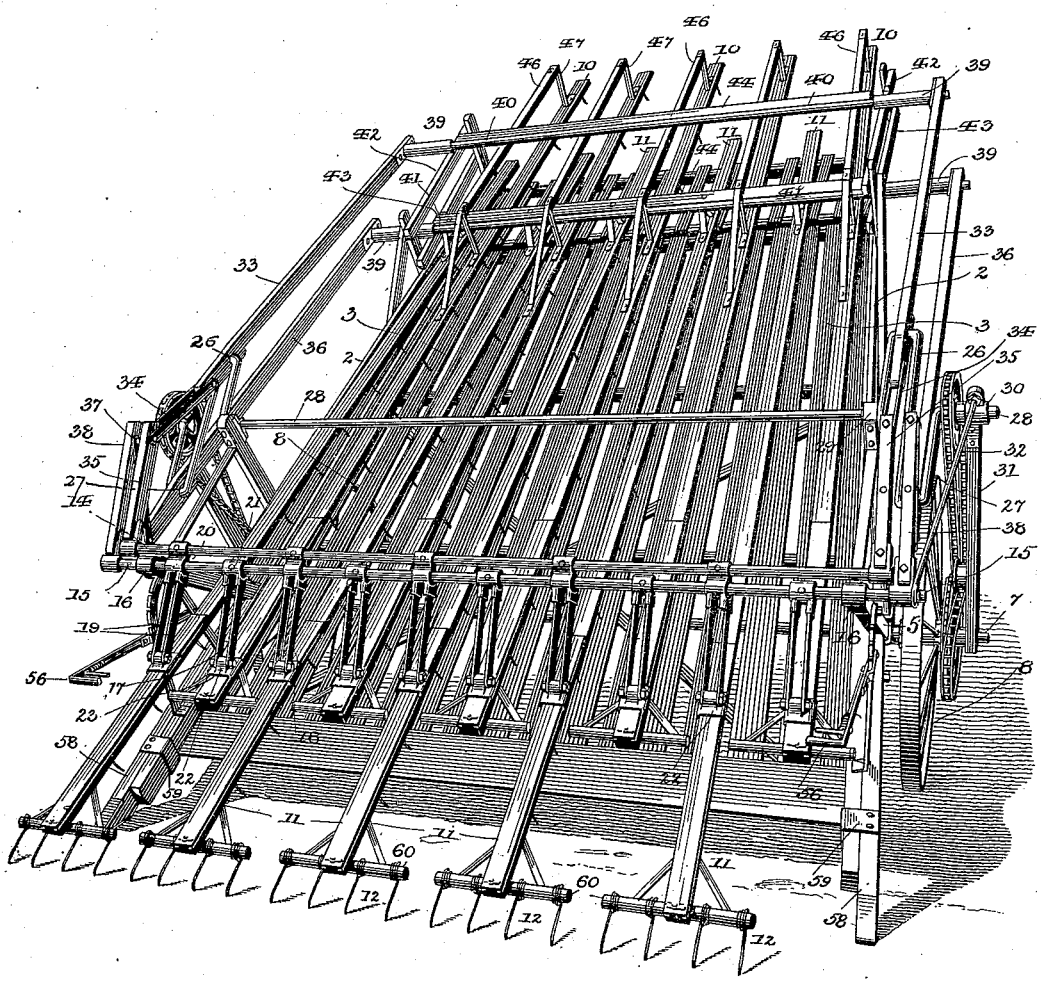
Figure 2:
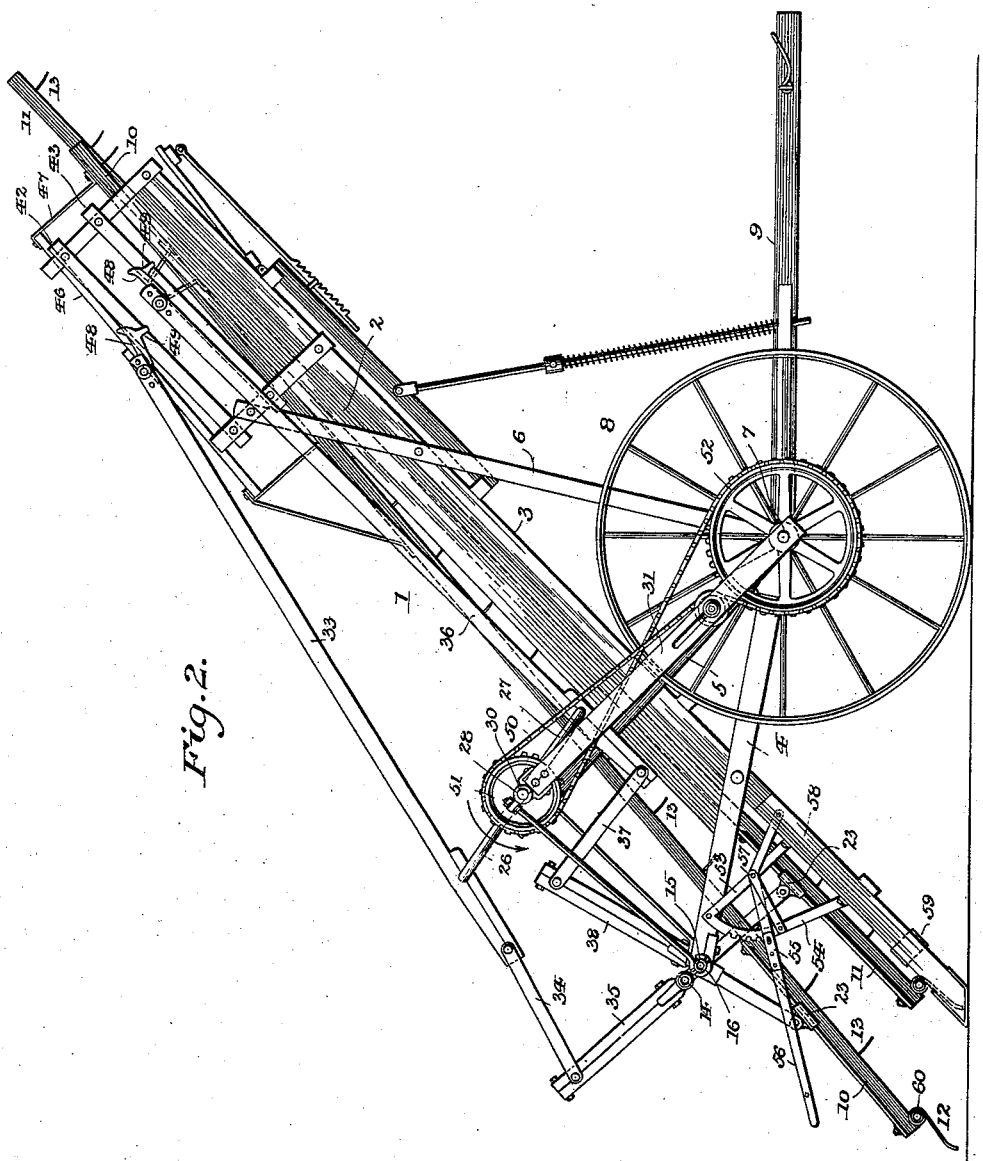

In the accompanying drawings, Figure 1, is a perspective view of my improved hay loader. Fig. 2, is a side elevation of the same. Fig. 3, is a top plan view of the same. Fig. 4, is a longitudinal section on the line a—a of Fig. 3. Fig. 5, is an enlarged view of the upper ends of the connections for moving the rake bars back and forth. Fig. 6, is a cross section through one of the rake bars and the pivoted guide through which the bar slides.

Referring to the drawings—1 represents a frame comprising side bars 2, connected by a slatted bottom 3, adapted to support the ascending hay. This frame is provided at opposite sides with three brace bars 4, 5 and 6, which are attached rigidly thereto, and have their lower ends connected together and mounted loosely on a horizontal axle 7, provided with a ground wheel 8. The frame is yieldingly sustained in an inclined position on the axle in a manner common in machines of this character, so that it may be rocked thereon to vary its inclination, and is propelled by a draft tongue 9, suitably connected to the axle in any convenient manner.

10 and 11 represent respectively two series of rake bars overlying the frame, and provided with gathering or rake teeth 12 and elevating teeth 13. These two series of rake bars are arranged side by side and alternate with each other, and are caused to reciprocate bodily and to move upward and downward at their lower ends.

In order to cause the rake bars to act in this manner I provide two rock shafts 14 and 15 which extend transversely of the frame above the rake bars, the shaft 15 being mounted in bearings 16 fixed on the upper ends of the brace bars 4.

The two series of rake bars are connected alternately to the shafts by means of two series of arms 17 and 18, each arm comprising two parallel rods 19, and a head 20, to which they are rigidly attached. The heads of the series of arms 17, are each provided with an opening, through which the shaft 15 extends, the two being held in fixed relation by a set screw 21, extending through the head and bearing on the shaft. The heads of the series of arms 18 are each provided with two openings, the shaft 15 passing loosely through one opening and the shaft 14, extending through the other opening and fixed therein by set screws as shown.

It will be seen from this description that the rock shaft 14 is sustained by the rock shaft 15 by means of the heads of the series of arms 18, the latter, as before stated, having two openings through one of which the rock shaft 15 passes, the shaft 14 extending through the other. When the shaft 14 is rocked by the mechanism more fully described hereinafter, the series of arms 18 fixed thereto, will be caused to move upward and downward at the same time turning on the rock shaft 15 as a fulcrum, the shaft 14 also turning to a limited extent around the other rock shaft as a center. When the shaft 15 is rocked, it turns in the arms 18, and moves the arms 17 which are fixed thereto, upward and downward.

At their lower ends the two rods composing the arms are seated on opposite sides of perforated lugs 22, extending upward from plates 23, the rods being connected thereto by means of pins extending through the perforations in the lugs, and the ends of the rods. As shown in Fig. 6, these plates are each provided at opposite sides with inwardly extending edges 24, which are adapted to extend in grooves 25, formed in the sides of the rake bars, the arrangement being such that the rake bars will be permitted to slide back and forth within the plates and will at the same time be caused by the motion of the plates to be moved upward and downward at their lower ends.

The shafts 14 and 15 are rocked to raise and lower the ends of the rake bars by means of oppositely extending cranks 26 and 27 located at opposite ends of a transverse shaft 28, the cranks being formed by bending the ends of the shaft laterally in opposite directions as shown in Fig. 1. This shaft is journaled in bearings 29, attached to the upper ends of the brace rod 5, and in bearings 30 on the upper ends of bars 31 sustained by the end of the axle, the latter bearings being connected by brace rods 32 to the ends of the shaft 15 before alluded to. The inner cranks 26 are extended through pitman bars 33, which are connected at their upper ends to the series of rake bars 10, in a manner more fully described hereinafter, while their opposite ends are connected pivotally by links 34 to arms 35, fixed rigidly to the ends of the shaft 14. The outer cranks 27 are extended through pitman bars 36, having their upper ends connected to the other series of rake bars 11, the lower ends of the pitman bars being pivotally connected by links 37, to rigid arms 38, connected to the ends of the rock shaft 15. From this description it will be seen that as the cranks rotate, they will operate through the connections described to move the two series of rake bars alternately back and forth longitudinally, and will at the same time raise and lower their lower ends by rocking the two shafts 14 and 15, these combined motions causing the parts to act at their lower ends with a long stroke near the ground, the most favorable movement for effectually gathering the hay and elevating the same.

As before stated, the upper ends of the pitman bars 33 and 36 are connected respectively to the two series of rake bars to cause them to move back and forth as the cranks are revolved. I prefer to connect these bars in the manner shown in the drawings in which it will be seen that the inner sides of the bars have bolted thereto, horizontal sleeves 39 through which and the ends of the bars, loosely extend two horizontal upper and lower shafts 40, 41, the ends of the sleeves being arranged to travel back and forth on upper and lower guide bars 42 and 43, fixed to the sides of the frame, as plainly shown. The two shafts have bolted or otherwise rigidly attached to their forward sides, transverse bars 44. The bar on the lower shaft 41, is bolted directly to brackets 45 extending upward from the series of rake bars 11, while the bar on the shaft 40, is bolted to rods 46, sustained a slight distance above the other series of bars by brackets 47, rising therefrom. From this it will be seen that the inner cranks cause one series of rake bars to move in one direction back and forth, and their lower ends to move upward and downward, while the outer cranks will cause the other series of rake bars to be moved in a corresponding manner, the said movements of the two series of bars alternating.

In order that the upper ends of the rake bars will be caused to lift partially out of the hay as they are moved rearward so as not to interfere with the ascent of the hay, I provide the sleeves 39 with upwardly extending shoes 48, arranged to move back and forth on the guides as the bars are correspondingly moved. These two shoes are provided with forward extensions 48 which slide back and forth upon the guide bars as the pitmen are reciprocated. When the pitmen are retracted by the cranks, they are at the same time raised at their rear ends and the forward ends of the shoes which are fixed thereto, act as fulcrums for the pitmen, which latter rise bodily and lift the series of rake bars with them, as plainly shown in first position, Fig. 5. When the pitmen are again advanced by the cranks, their rear ends are lowered, and they again move toward the bed of the machine at their upper ends, thereby lowering the series of rake bars, as shown in the second position, Fig. 5. It will be seen, therefore, that the pitmen as they are retracted, rock or tip on the extreme ends of the shoes, and as they advance they are lowered when the shoes slide along the guides, lying flat upon the same. In this way on the retreat of the rake bars they are lifted bodily from the hay, and are again moved toward the bed of the machine as they advance. In order that the shoes may be prevented from accidentally sliding off the guides, they are provided with lateral fingers 49, extending beneath the guide bars. These shoes are provided with lateral fingers 49, extending beneath the guide bars.

Motion is imparted to the crank shaft 28, by means of sprocket chains 50, which pass around sprocket wheels 51, fixed to the ends of the shaft, and around sprocket wheels 52 clutched to the ground wheels, the chain being so arranged as clearly shown, that as the machine is advanced, the shaft will be caused to revolve in the opposite direction as indicated by the arrow in Fig. 2.

In order that the lower end of the frame may be raised or lowered, I adopt the construction shown more particularly in Figs. 1 and 2, in which it will be seen that at their lower ends the two side bars of the frame have bolted to them standards 53 and 54, connected at their upper ends to the brace bar 4, each of the standards 53, being provided with teeth in position to be engaged by a locking dog 55, mounted on a lever 56, pivoted at 57 to the standard 54.

The lower end of the levers are bolted to sliding shoes 58, provided with sleeves 59 loosely embracing the lower ends of the side bars of the frame, the arrangement being such that as the levers are moved upward, the shoes will be moved bodily and extended beyond the ends of the side bars, and engaging the ground will cause the lower end of the frame to be elevated.

The gathering or rake teeth 12 as shown are coiled around lateral rods 60, attached to the lower ends of the rake bars. In order that these teeth may be prevented from becoming loose, and in order that they may possess the requisite amount of "spring" or elasticity, I form each with three coils of different diameters, the inner coils closely embracing the rods, and attached thereto. I have found that this construction effectually overcomes the objectionable action of the teeth in cases where a limited play is given to cause them to spring.

Having thus described my invention, I claim—

1. In a hay loader the combination of a series of rake bars, means for moving the same longitudinally, guides through which the rake bars slide, a rock shaft, a series of arms connected at one of their ends to the rock shaft and pivoted at their opposite ends to the guides, and means for rocking the shaft.

2. In a hay loader the combination of two series of rake bars, means for moving the same alternately in a longitudinal direction, guides through which the rake bars slide, two rock shafts, two series of arms fixed at one of their ends to the two rock shafts respectively, and pivoted at their opposite ends to the movable guides, and means for rocking the shafts.

3. In a hay loader the combination of two series of rake bars, means for moving the same longitudinally, movable guides sustaining the rake bars, two rock shafts, two series of arms pivoted at one of their ends to the movable guides, one of said series of arms loosely encircling one of the rock shafts and attached rigidly to the other rock shaft, and the other series of arms connected rigidly to the encircled rock shaft, and means for rocking the shafts.

4. The combination of the series of rake bars, a transverse bar connecting their upper ends, a pitman pivoted at its upper end to the connecting bar, a crank connected to the lower end of the pitman, a shoe fixed to said pitman and provided with a forward extension, and a guide or track on which the shoe slides; whereby when the lower end of the pitman is elevated by the crank on its backward movement, the forward end of the pitman will move upward on the end of the shoe as a fulcrum and the rake bars will be raised bodily.

5. In a hay loader the combination of a series of rake bars, a transverse shaft connected to their upper ends, pitman bars, cranks connected to the lower ends of the pitman bars, rigid sleeves fixed to said bars near their upper ends provided with shoes, said sleeves encircling the transverse shaft, and guides on which the shoes travel, whereby when the pitmen are retracted by the cranks and their lower ends elevated, the upper ends will move upward on the shoes as fulcrums, thereby raising the rake bars bodily.

6. In a hay loader the combination of the axle, the ground wheels, the inclined frame mounted to rock on the axle, the movable shoe at the lower end of the frame in position to engage the ground, and means controlled by a hand lever for moving said shoe to engage the ground, whereby by the movement of the lever the shoe may be moved to raise or lower the lower end of the frame as circumstances may demand.

7. In a hay loader the combination of the axle, the ground wheels, the inclined frame mounted to rock thereon, the series of rake bars sustained by said frame, the longitudinally movable sliding shoes at the lower end of the frame arranged to rest upon the ground, the standards rising from the frame, the hand levers pivoted to said standards and having their lower ends connected to the shoes.

In testimony whereof I hereunto set my hand, this 8th day of May, 1893, in the presence of two attesting witnesses.

EMIL EINFELDT.

Witnesses:
NATHL. FRENCH,
G. WATSON FRENCH.